United States Patent
Yamada (10) Patent No.: US 9,883,102 B2
(45) Date of Patent: Jan. 30, 2018

(54) IMAGE PROCESSING APPARATUS, IMAGE PROCESSING METHOD, PROGRAM, AND CAMERA

(71) Applicant: JVC KENWOOD Corporation, Yokohama-shi, Kanagawa (JP)

(72) Inventor: Kunio Yamada, Yokohama (JP)

(73) Assignee: JVC KENWOOD CORPORATION, Yokohama-Shi, Kanagawa (JP)

(*) Notice: Subject to any disclaimer, the term of this patent is extended or adjusted under 35 U.S.C. 154(b) by 46 days.

(21) Appl. No.: 14/667,584

(22) Filed: Mar. 24, 2015

(65) Prior Publication Data
US 2015/0281576 A1 Oct. 1, 2015

(30) Foreign Application Priority Data

Mar. 31, 2014 (JP) .................................. 2014-072757
Jun. 9, 2014 (JP) .................................. 2014-118559

(51) Int. Cl.
*H04N 7/00* (2011.01)
*H04N 5/77* (2006.01)
*G11B 27/00* (2006.01)
*H04N 5/93* (2006.01)
*H04N 5/232* (2006.01)
(Continued)

(52) U.S. Cl.
CPC .......... *H04N 5/23238* (2013.01); *G06T 7/33* (2017.01); *G06T 11/60* (2013.01); *H04N 5/23264* (2013.01); *G06T 2200/32* (2013.01); *G06T 2207/10016* (2013.01)

(58) Field of Classification Search
None
See application file for complete search history.

(56) References Cited

U.S. PATENT DOCUMENTS

2007/0031062 A1* 2/2007 Pal ............... G06F 17/30843
382/284
2007/0223909 A1 9/2007 Tanaka
(Continued)

FOREIGN PATENT DOCUMENTS

JP 2007-266667 A 10/2007
JP 2013030875 A1 7/2013

OTHER PUBLICATIONS

U.S. Appl. No. 14/663,961, filed Mar. 20, 2015 (not yet published); related application.
(Continued)

*Primary Examiner* — Hung Dang
(74) *Attorney, Agent, or Firm* — Procopio, Cory, Hargreaves & Savtich LLP (57) ABSTRACT

Provided are an image processing apparatus, an image processing method, a program, and a camera which are capable of generating a joined image in which misalignment is less likely to occur. An image processing apparatus according to an exemplary embodiment includes a motion vector derivation unit that derives a motion vector between images of a plurality of images; a correction unit that corrects a motion vector between images included in a target section from a first image to a second image based on cumulative errors in the section from the first image to the second image; and a texture writing unit that writes, into a frame memory, the plurality of textures that form the joined image, based on the motion vector corrected by the correction unit.

6 Claims, 6 Drawing Sheets

(51) Int. Cl.
  *G06T 11/60* (2006.01)
  *G06T 7/33* (2017.01)

(56) References Cited

U.S. PATENT DOCUMENTS

| | | | |
|---|---|---|---|
| 2009/0058991 A1* | 3/2009 | Kim | G03B 37/04 |
| | | | 348/37 |
| 2011/0149016 A1* | 6/2011 | Kimura | H04N 5/232 |
| | | | 348/36 |
| 2014/0139621 A1 | 5/2014 | Shinozaki et al. | |
| 2014/0307045 A1* | 10/2014 | Richardt | H04N 5/23238 |
| | | | 348/36 |

OTHER PUBLICATIONS

U.S. Appl. No. 14/667,561, filed Mar. 24, 2015 (not yet published); related application.

M. G. Gonzalez, P. Holifield and M. Varley, "Improved Video Mosaic Construction by Accumulated Alignment Error Distribution", Proceedings of the British Machine Conference, pp. 38.1-38.11, BMVA Press, Sep. 1998.

\* cited by examiner

IMAGE PROCESSING APPARATUS, IMAGE PROCESSING METHOD, PROGRAM, AND CAMERA

INCORPORATION BY REFERENCE

This application is based upon and claims the benefit of priority from Japanese patent application No. 2014-072757, filed on Mar. 31, 2014 and Japanese patent application No. 2014-118559, filed on Jun. 9, 2014 the disclosure of which is incorporated herein in its entirety by reference.

BACKGROUND OF THE INVENTION

1. Field of the Invention

The present invention relates to an image processing apparatus, an image processing method, a program, and a camera.

2. Description of Related Art

In recent years, a technique for creating a still image panorama by photographing a moving image while manually moving a camera so as to cover a large subject has been put into practical use. In this technique, a panoramic image is generated by joining the frame images constituting the moving image. A technique for creating a panoramic still image is generalized in the form of, for example, an additional function of a digital camera. This technique is based on a method in which a motion vector is derived during shooting with a panning technique and an area for a seam between frame images to be stitched together is controlled based on the motion vector.

There is also a technique for forming a larger image by connecting a plurality of still images or moving image sequences (see Japanese Unexamined Patent Application Publication No. 2007-266667; and M. G. Gonzalez, P. Holifield and M. Varley, "Improved Video Mosaic Construction by Accumulated Alignment Error Distribution", Proceedings of the British Machine Conference, pp. 38.1-38.11, BMVA Press, September 1998 (hereinafter referred to as "Non-patent Literature 1"). This technique is generally and widely known as, for example, panorama or photomosaicing. Especially since the time that use of digital cameras became widespread, the use of software for automatically or semi-automatically performing such processing has become widespread. A panoramic still image is basically created based on a linear camera trajectory. However, in principle, it is possible to join moving images captured along a free two-dimensional camera trajectory.

SUMMARY OF THE INVENTION

A first exemplary aspect of the present invention is an image processing apparatus that generates a joined image by joining a plurality of textures based on a plurality of images, the image processing apparatus including: a motion vector derivation unit that derives a motion vector between images of the plurality of images; a correction unit that corrects a motion vector between images included in a target section from a first image to a second image based on cumulative errors in the target section from the first image to the second image; and a texture writing unit that writes, into a frame memory, the plurality of textures that form the joined image, based on the motion vector corrected by the correction unit.

A second exemplary aspect of the present invention is an image processing method that generates a joined image by joining a plurality of textures based on a plurality of images, the image processing method including: a motion vector derivation step of deriving a motion vector between images of the plurality of images; a correction step of correcting a motion vector between images included in a target section from a first image to a second image based on cumulative errors in the target section from the first image to the second image; and a texture writing step of writing, into a frame memory, the plurality of textures that form the joined image, based on the motion vector corrected in the correction step.

A third exemplary aspect of the present invention is a non-transitory computer readable medium storing a program for causing a computer to execute image processing that generates a joined image by joining a plurality of textures based on a plurality of images, the image processing including: a motion vector derivation step of deriving a motion vector between images of the plurality of images; a correction step of correcting a motion vector between images included in a target section from a first image to a second image based on cumulative errors in the target section from the first image to the second image; and a texture writing step of writing, into a frame memory, the plurality of textures that form the joined image, based on the motion vector corrected in the correction step.

DESCRIPTION OF THE EXEMPLARY EMBODIMENTS

Figure 6:
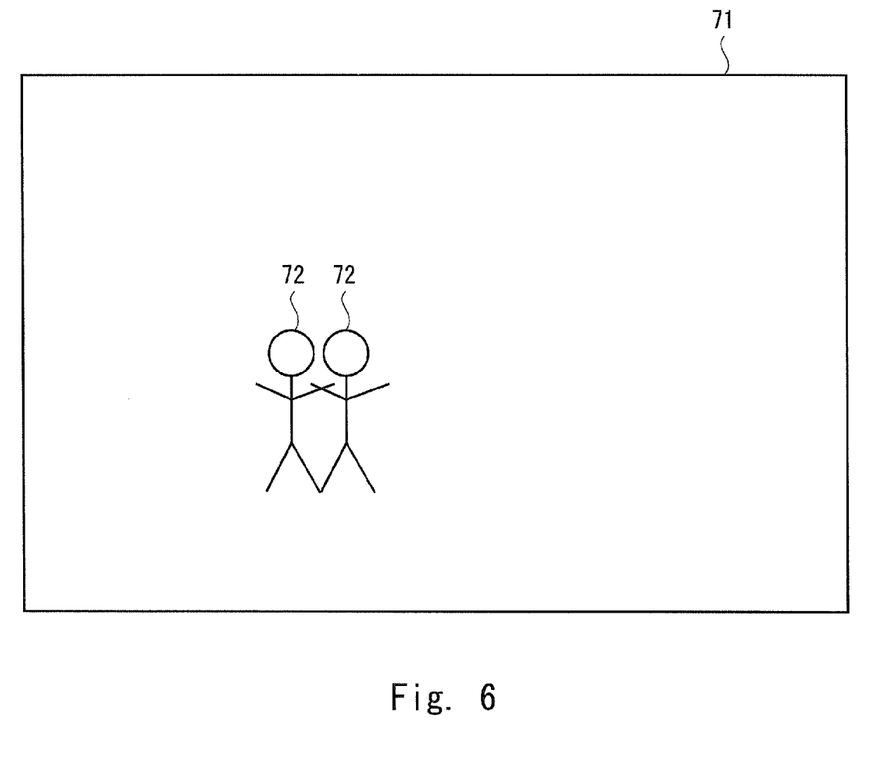
FIG. 6 is a diagram showing a joined image in which looping path problem has occurred.

In the process of joining moving images captured along a free two-dimensional camera trajectory, in principle, "looping path problem" as disclosed in Chapter 3 of Non-patent Literature 1 occurs in many cases. The "looping path problem" is a problem where in the process of joining moving images captured along a loop-like camera trajectory, the moving images which are supposed to be at the same position are misaligned due to accumulation of errors in motion vectors. For example, when a person is set as a subject 72 and a camera is moved in a loop, the position of the subject 72 is misaligned in a joined image 71 as shown in FIG. 6.

Non-patent Literature 1 solves the above problem by repeatedly performing the processing of slightly changing the position of each image involved in the accumulation of errors. Further, since the accumulation of errors is caused merely by image processing, it is expected that the problem can be solved or alleviated by using information from, for example, high-precision sensors such as a direction sensor, a posture sensor, and an acceleration sensor.

However, the calculation costs of repeated processing associated with the correction of the position of each image are extremely large. In addition, subpixel processing is essential for fine positional adjustment, which inevitably leads to deterioration of textures due to interpolation processing or the like. Furthermore, it is not realistic to introduce small sensors having sufficiently high performance into small, light-weight, and low-cost devices. Thus, the looping path problem makes it difficult to appropriately generate a joined image.

Even when the subject 72 is not out of the field of view, a problem similar to "the looping path problem" may occur. In other words, the subject 72 is displayed in a duplicate manner in the joined image in some cases not only when the subject 72 is temporarily moved outside of the field of view as in the "looping path problem", but also when the field of view is changed by moving the camera in a wide range.

The present invention has been made in view of the above-mentioned circumstances, and an object of the present invention is to provide an image processing apparatus, an image processing method, a program, and a camera which are capable of generating a joined image in which misalignment is less likely to occur.

An image processing apparatus according to an exemplary embodiment is, for example, mounted on a camera for photographing moving images. When a user who uses the camera selects a panoramic still image mode, a panoramic still image is generated based on moving images.

The image processing apparatus generates a joined image by joining a plurality of images captured by changing an image pickup direction. For example, the user performs a pan operation to change the image pickup direction of the camera to the horizontal direction (right-left direction). Specifically, the angle of view of the camera is changed when the camera is moved during the obtainment of the moving images which are a set of still images captured continuously in terms of time. Textures obtained from each frame (still image) of the moving images thus obtained are joined together to thereby generate a joined image. For example, one joined image can be generated by overwriting a frame memory with the textures. Each texture may be a frame itself, or a partial area of the frame. The field of view of the camera indicates a range in which images can be captured by the camera, and is determined by the angle of view of the camera (image pickup unit). Thus, the user performs the pan operation to change the direction of the camera, thereby changing the field of view.

The image pickup direction may be changed not only to the horizontal direction but also to the vertical direction (up-down direction). In this manner, the image processing apparatus generates a joined image by using the moving images that are captured by the user while manually moving the camera freely in a two-dimensional manner. The joined image has a pixel size larger than the pixel size of the images captured by the image pickup device.

This exemplary embodiment aims to provide an image processing apparatus and an image processing method which alleviate the looping path problem by post-processing in the process of joining moving images captured along a free two-dimensional camera trajectory. Since this exemplary embodiment eliminates the need for subpixel processing, the position of each texture to be written can be corrected by simple processing. Accordingly, a joined image in which misalignment is less likely to occur can be generated.

Figure 1:
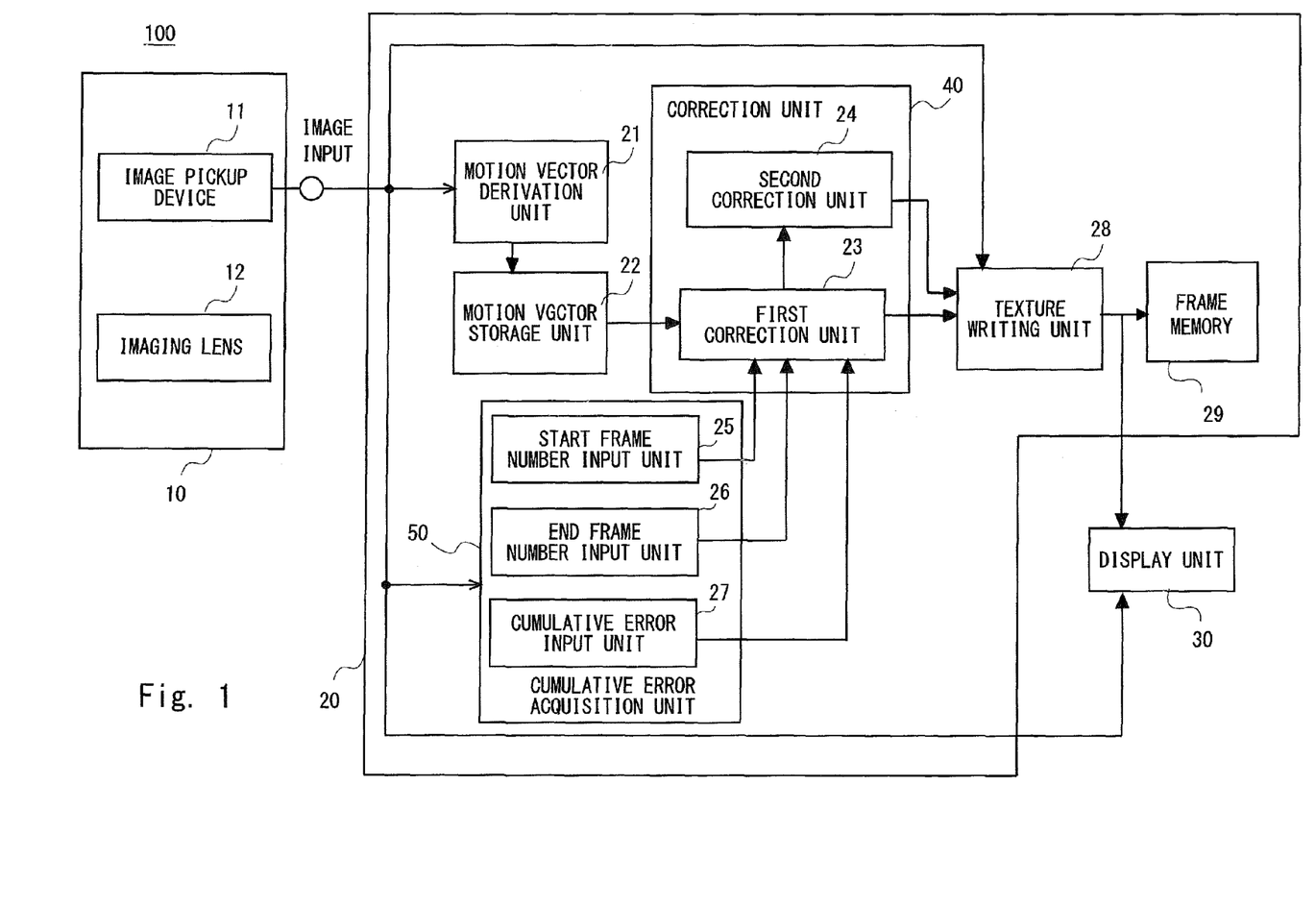
FIG. 1 is a block diagram showing a configuration of a camera according to an exemplary embodiment.

Next, the configurations of the image processing apparatus and the camera according to this exemplary embodiment will be described with reference to FIG. 1. FIG. 1 is a block diagram showing the configuration of the camera that incorporates the image processing apparatus according to this exemplary embodiment.

A camera 100 includes an image pickup unit 10, an image processing apparatus 20, and a display unit 30. The image processing apparatus 20 performs image processing for generating a joined image from moving images. The image processing apparatus 20 includes a motion vector derivation unit 21, a motion vector storage unit 22, a correction unit 40, a cumulative error acquisition unit 50, a texture writing unit 28, and a frame memory 29. The correction unit 40 includes a first correction unit 23 and a second correction unit 24. The cumulative error acquisition unit 50 includes a start frame number input unit 25, an end frame number input unit 26, and a cumulative error input unit 27.

The frame memory 29 includes a predetermined number of pixels in the vertical direction and the horizontal direction. For example, the frame memory 29 has a rectangular pixel structure. In the frame memory 29, the textures that form the joined image are each written at a pixel position corresponding to a motion vector between pixels.

The image pickup unit 10 includes an image pickup device 11 and an imaging lens 12. The image pickup unit 10 photoelectrically converts light from a subject to generate a moving image. The light is input to the image pickup device 11 through the imaging lens 12. The image pickup unit 10 outputs the generated moving image to the image processing apparatus 20. The imaging lens 12 includes a plurality of lenses and actuators to adjust focusing, zooming, and the like. The image pickup device 11 is a CCD (Charge Coupled Device) or a CMOS (Complementary Metal Oxide Sensor) device. The moving image obtained by the image pickup unit 10 is input to the image processing apparatus 20. The display unit 30 includes a display device such as a liquid crystal display or an organic EL (Electroluminescence) display. The display unit 30 displays the moving image obtained by the image pickup unit 10. Specifically, the display unit 30 sequentially displays each frame of the moving image. The camera 100 is provided with an operation unit (not shown) with which the user operates the camera. For example, when a touch panel is used as the display unit 30, the display unit 30 serves as the operation unit. The operation unit may be buttons or the like.

Each block in the image processing apparatus 20 can be implemented in a hardware manner by a CPU (Central Processing Unit), a memory, and other LSI (Large Scale Integration) of any computer, and can be implemented in a software manner by, for example, a program loaded into the memory. FIG. 1 illustrates the functional blocks implemented in a cooperative manner. Accordingly, it can be understood by those skilled in the art that these functional blocks can be implemented in various manners by, for example, using only hardware, using only software, or using a combination thereof.

The image pickup unit 10 inputs the frame images constituting the moving image to the image processing apparatus 20. The motion vector derivation unit 21 derives a motion vector for each frame image. The motion vector derivation unit 21 derives, for example, a global motion vector between two successive frame images as the motion vector. A well-known matching evaluation method can be used to derive the motion vector. For example, the motion vector derivation unit 21 performs matching between the two frame images pixel by pixel, and detects, as a motion, the amount of displacement obtained when the error is minimized. Further, the motion vector derivation unit 21 derives the motion between the frame images in the form of a two-dimensional vector.

The motion vector derivation unit 21 uses a rectangular texture having the same pixel size as that of the frame image. The motion vector derivation unit 21 compares the rectangular textures of the two frame images, thereby deriving the motion vector. The motion vector derivation unit 21 sequentially derives motion vectors for the successively input frame images.

The motion vector storage unit 22 stores the motion vectors derived by the motion vector derivation unit 21. For example, the motion vector storage unit 22 stores, as a history, the motion vectors in chronological order. The motion vector storage unit 22 stores the motion vectors, which are derived for each frame, in such a manner that the motion vectors are linked to the respective frame numbers. In other words, the motion vector storage unit 22 stores the motion vectors in the order of frame numbers.

The texture writing unit 28 receives the frame images from the image pickup unit 10. The texture writing unit 28 writes each texture of the frame images into the frame memory 29. In other words, the texture writing unit 28 writes each texture at a position corresponding to a motion vector in the frame memory 29. Thus, the frame memory 29 is sequentially overwritten with textures of new frames. A minimum rectangular area including a portion where the textures are present in the frame memory 29 corresponds to the joined image.

Further, the image processing apparatus 20 performs image processing to reduce cumulative errors caused due to the looping path problem. Specifically, assuming that a section between a start frame including a subject and an end frame, which is an image in which the subject that is included in the first image and is temporarily out of the image is positioned within the image again, is defined as a target section, cumulative errors caused in the target section are calculated. Then the cumulative errors caused in the target section are corrected to thereby generate a joined image. This contributes to a reduction in cumulative errors. The image processing apparatus 20 includes the correction unit 40 which is provided with the first correction unit 23 and the second correction unit 24 to correct cumulative errors.

In the first correction unit 23 and the second correction unit 24, a correction process is performed as described later. Prior to the correction process, the text writing unit 28 first writes the textures into the frame memory 29 by using a group of original motion vectors which are not corrected. In other words, the texture writing unit 28 generates a joined image by repeatedly overwriting the frame memory 29 with the textures of the temporally subsequent frame image.

The cumulative error acquisition unit 50 acquires cumulative errors which are position errors of the subject before and after the time when the subject is out of the field of view. That is, the cumulative error acquisition unit 50 acquires the cumulative errors accumulated in the target section.

In the joined image on which the correction process is not performed, errors are accumulated due to the looping path problem as described above, resulting in misalignment of the subject. The cumulative error input unit 27 inputs, to the first correction unit 23, the cumulative errors in the joined image on which the correction process is not performed.

For example, in the case of generating a joined image using a moving image sequence in which a certain subject is temporarily out of the field of view and is positioned in the field of view again, misalignment of the subject occurs in the joined image. Assuming that a position P1 represents a predetermined point of the subject before the subject is out of the field of view and that a position P2 represents a predetermined point of the subject after the subject is out of the field of view, misalignment between the position P1 and the position P2 is determined to be cumulative errors. Since each cumulative error includes a horizontal component and a vertical component, the cumulative error is represented as a vector form of (dev_x, dev_y) (in units of integer pixels).

The cumulative error acquisition unit 50 checks the group of frames of moving images to be joined together. Further, the cumulative error acquisition unit 50 sets, as the start frame of the target section, the frame obtained before the portion corresponding to the position P1 is out of the field of view, and sets, as the end frame of the target section, the frame obtained before the portion corresponding to the position P2 is out of the field of view. If the portion corresponding to the position P2 is not moved outside of the field of view until the last frame is reached, the last frame in the frame group is set as the end frame of the target section.

The start frame number input unit 25 inputs the start frame number f_begin of the start frame to the first correction unit 23. The end frame number input unit 26 inputs the number f_end of the end frame to the first correction unit 23.

Figure 2:
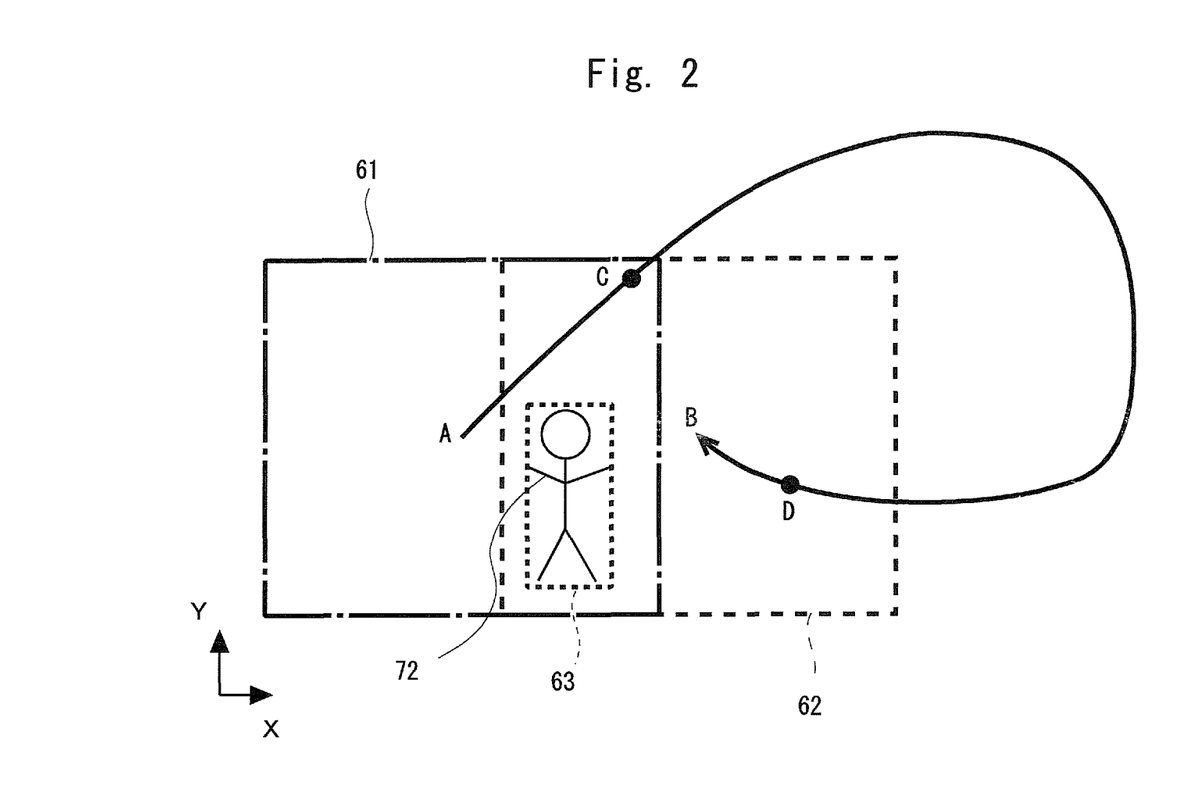
FIG. 2 is a diagram showing a start frame and an end frame.

Referring now to FIG. 2, a trajectory formed by frame images, the start frame, and the end frame will be described. FIG. 2 is a diagram showing a trajectory formed by frame images from a first frame 61 to a last frame 62 in the entire moving image. The trajectory of the center position of each frame image is indicated by an arrow in FIG. 2. In this example, the trajectory is formed by the frame images in such a manner that the field of view is moved two-dimensionally as indicated by the arrow from a position A of the first frame 61 and is then moved to a position B of the last frame 62. FIG. 2 also shows a two-dimensional Cartesian coordinate system in which the horizontal direction of each frame is represented by the x-direction and the vertical direction of each frame is represented by the y-direction.

In this example, the first frame 61 includes the specific subject 72. Next, the field of view is moved in a loop from the position A of the first frame 61 to the position B of the last frame 62. When the frame image is moved as indicated by the arrow from the position A, the subject 72 is temporarily excluded from the frame image and then appears again in the frame image. Further, the frame image is moved to the position B of the last frame 62. In this manner, the joined image is generated using a moving image sequence in which the certain subject 72 is temporarily out of the field of view and is then positioned in the field of view again.

A frame located at a position C before the subject 72 is not out of the field of view is set as the start frame of the target section. A frame located at a position D after the subject 72 is temporarily out of the field of view is set as the end frame of the target section. The start frame and the end frame of the target section may be determined by the user. For example, the user can determine the start frame and the end frame while viewing the acquired moving images.

The subject 72 to be processed may be selected by the user. For example, the user puts a frame 63 around the specific subject 72 while viewing the joined image or the frame images by using a touch panel screen, a mouse, or the like. This makes it possible to set the subject 72 that is temporarily out of the frame of the image pickup unit 10 during the acquisition of the frame images constituting the joined image. For example, the user can select the subject 72 which is greatly misaligned in the joined image.

After the user determines the subject 72, the cumulative error acquisition unit 50 performs, for example, pattern matching on each frame image, to thereby determine whether the subject 72 is included in the frame image or not. Further, the cumulative error acquisition unit 50 determines the misalignment of the subject 72 by comparing the frame images obtained before and after the subject 72 is out of the field of view, and determines the misalignment to be cumulative errors. Thus, the cumulative error acquisition unit 50 acquires cumulative errors by comparing the position of the subject 72 included in the start frame with the position of the subject 72 included in the end frame. The misalignment of the subject 72 may be determined by focusing on the entire area of the subject 72, or by focusing on a partial area of the subject 72. The start frame and the end frame of the target section may be used as the two frames to acquire the cumulative error, or frames other than the start frame and the end frame may be used as the two frames.

Alternatively, the misalignment of the subject 72 to be processed may be determined based on an operation input by the user. For example, the user specifies at least one point for each position of the misaligned subject 72 to be processed, while viewing the joined image or the frame images by using a touch panel screen, a mouse, or the like. The cumulative error acquisition unit 50 can acquire cumulative errors based on the specified points.

Figure 3:
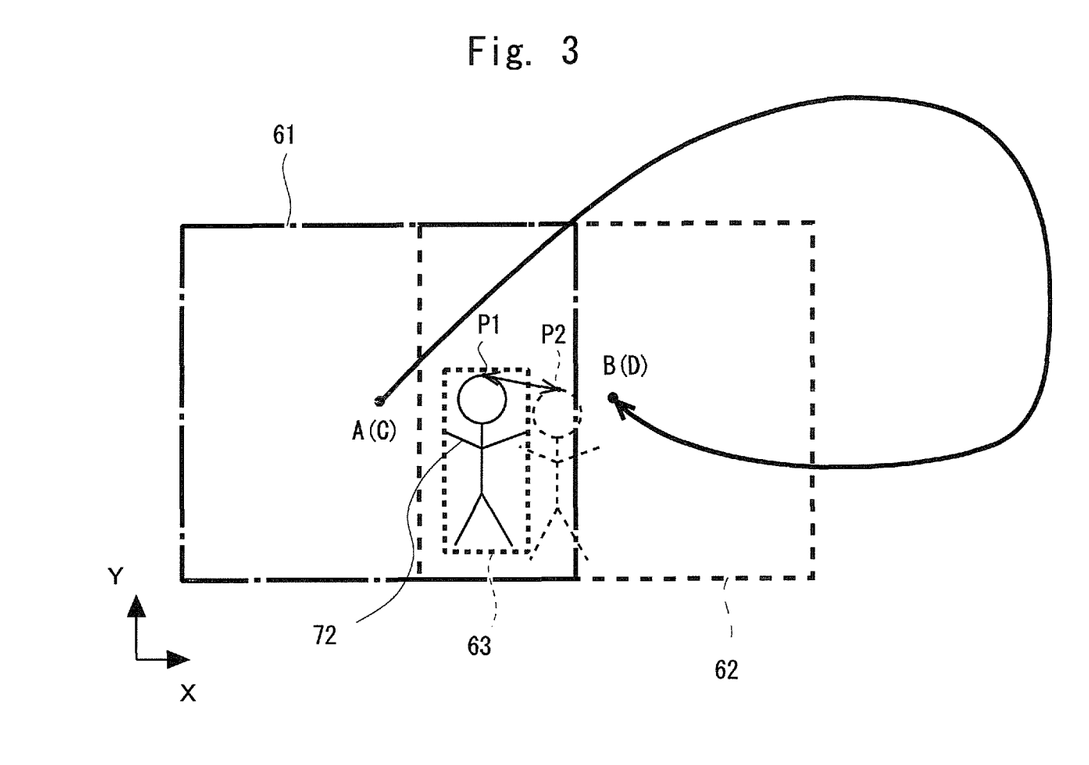
FIG. 3 is a diagram showing an operation input by a user.

Referring now to FIG. 3, the operation input by the user will be described. FIG. 3 is a diagram showing a trajectory formed by the frame images from the first frame 61 to the last frame 62 in the entire moving image. The trajectory of the center position of each frame image is indicated by an arrow in FIG. 3. In this example, the first frame 61 is set as the start frame of the target section and the last frame 62 is set as the end frame of the target section. Accordingly, the position A of the first frame coincides with the position C of the start frame, and the position B of the last frame coincides with the position D of the end frame.

First, one point of the subject 72 in the start frame of the target section is selected as the position P1. Next, one point of the subject 72 in the end frame can be selected as the position P2. Thus, when the user determines the position P1 and the position P2, the cumulative error acquisition unit 50 determines the misalignment of the subject 72 based on the position P1 and the position P2, and determines the misalignment to be cumulative errors.

The first correction unit 23 evenly distributes the cumulative errors to the frames included in the target section. The first correction unit 23 performs a correction process by evenly distributing the accumulation error to a plurality of frames, which are included in the target section, by n (n is an integer including 0) pixels. The first correction unit 23 corrects the cumulative errors for motion vectors of all frames included in the target section.

The second correction unit 24 extracts, from the target section, distributed frames to which residual errors obtained after removing a correction amount from the cumulative errors in the first correction unit 23 are distributed. Further, the second correction unit 24 distributes the residual errors to each of the extracted distributed frames by one pixel, to thereby correct the motion vectors. In other words, the second correction unit 24 distributes the residual errors to a part of the frames in the target section. Accordingly, the second correction unit 24 corrects the motion vectors for a part of the plurality of frames included in the target section.

The texture writing unit 28 writes, into the frame memory 29, textures based on the correction results of the first correction unit 23 and the second correction unit 24. Thus, the frame memory 29 stores the joined image in which the cumulative errors are corrected. The display unit 30 displays the joined image.

Figure 4:
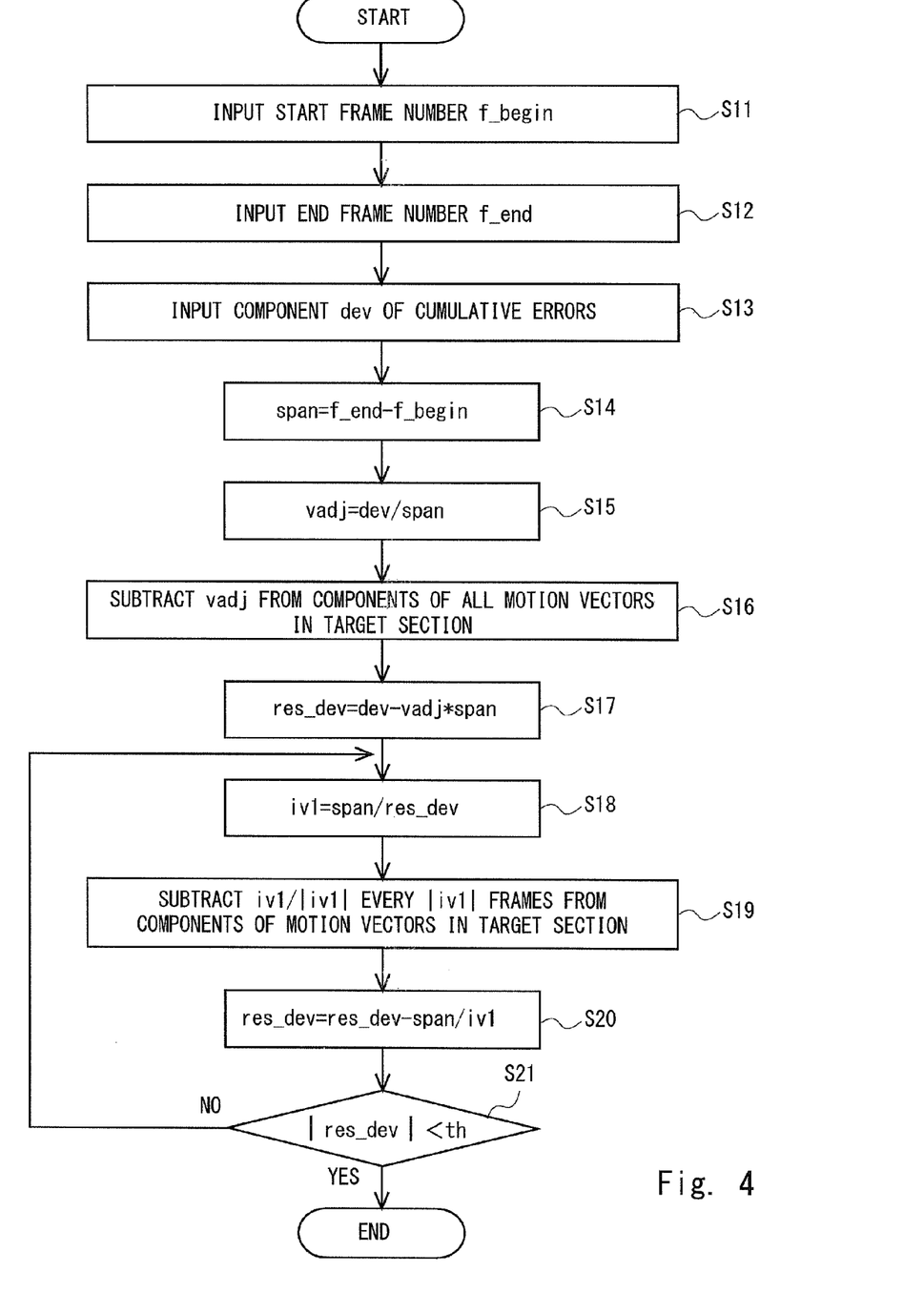
FIG. 4 is a flowchart showing an image processing method according to an exemplary embodiment.

The processing of each block in the image processing apparatus 20 will be described below with reference to FIG. 4. FIG. 4 is a flowchart showing an image processing method according to this exemplary embodiment. The processing for correcting the cumulative errors will be described below. Since well-known techniques can be used for normal processing in the camera 100, i.e., processing other than the processing for correcting the cumulative errors, the description of the normal processing is omitted.

The start frame number input unit 25 inputs the start frame number f_begin of the target section to the first correction unit 23 (S11). The end frame number input unit 26 inputs the end frame number f_end of the target section to the first correction unit 23 (S12). The start frame and the end frame may be determined by the user, or may be determined by the image processing apparatus 20.

The cumulative error input unit 27 inputs a component dev of the cumulative errors to the first correction unit 23 (S13). The cumulative errors are input to the first correction unit 23 as a cumulative error vector having components in the horizontal direction and the vertical direction. The processing for correcting the cumulative error dev_x in the horizontal direction is similar to the processing for correcting the cumulative error dev_y in the vertical direction. Accordingly, the components (dev_x, dev_y) of the cumulative errors are abbreviated as "dev". Specifically, the processing of steps S14 to S21 is performed on each of the cumulative error dev_x in the horizontal direction and the cumulative error dev_y in the vertical direction. In the case of correcting the cumulative error dev_x in the horizontal direction, dev=dev_x holds. In the case of correcting the cumulative error in the vertical direction, dev=dev_y holds. The image processing apparatus 20 performs processing using the same algorithm separately for the component in the horizontal direction and the component in the vertical direction.

The cumulative error acquisition unit 50 acquires the cumulative error vector (dev_x, dev_y) based on the misalignment of the subject 72 between the textures of the frame images obtained before and after the time when the subject 72 is out of the field of view. In other words, the cumulative error acquisition unit 50 acquires the cumulative error vector based on the textures of two frame images.

Next, the first correction unit 23 calculates the number "span" of the frames that form the target section as span=f_end-f_begin (S14). Specifically, the number "span" of the frames represents the number of frames included in the target section, and thus the number "span" of the frames is calculated as a difference between the end frame number and the start frame number.

Next, the first correction unit 23 calculates a correction value "vadj" as vadj=dev/span to distribute the component "dev" of the cumulative errors to the frames in the target section (S15). The first correction unit 23 calculates the correction value "vadj" using truncating integer arithmetic. Accordingly, when the absolute value of the component "dev" of the cumulative errors is equal to or greater than the number "span" of the frames, the correction value "vadj" is derived to allow an adjustment for the motion vectors of the frames. On the other hand, when the absolute value of the component "dev" of the cumulative errors is less than the number "span" of the frames, the correction value "vadj" is 0.

Further, the first correction unit 23 performs a first correction process by subtracting the correction value "vadj" from the components of all motion vectors in the target section (S16). The first correction unit 23 performs the correction process by evenly distributing n (n is an integer including 0) pixels to a plurality of frames included in the target section. That is, the first correction unit 23 corrects the motion vectors of all frames in the target section every n pixels. The value "n" may be a negative integer. In the first correction process performed by the first correction unit 23, the correction values for the motion vectors of all frames in the target section are equal to each other.

Next, the second correction unit 24 computes a residual error "res_dev", which is obtained after the first correction process, as res_dev=dev-vadj*span (S17). Specifically, the second correction unit 24 subtracts the product of the correction value "vadj" and the number "span" of the frames from the component "dev" of the cumulative errors, thereby calculating the residual error "res_dev". The residual error "res_dev" is a difference between the component "dev" of the cumulative errors and a correction amount (vadj*span) of the correction made by the first correction unit 23. The residual error "res_dev" is calculated by removing the correction amount, which is obtained by the first correction unit 23, from the cumulative errors.

The absolute value of the residual error "res_dev" is smaller than the number "span" of the frames. To eliminate the need for subpixel processing, the second correction unit 24 performs the processing by adding or subtracting one pixel to or from every X frames (X is an integer equal to or greater than 1) in the target section. Accordingly, the second correction unit 24 calculates a frame interval "ivl" as ivl=span/res_dev to select the frames to be corrected (S18). The second correction unit 24 calculates the frame interval "ivl" using truncating integer arithmetic. In other words, the frame interval "ivl" is calculated as any positive or negative integer excluding 0.

The second correction unit 24 subtracts ivl/|ivl| every |ivl| frames from the components of the motion vectors in the target section (S19). Note that |ivl| represents the absolute value of the frame interval "ivl". The second correction unit 24 extracts the frames, to which the residual error "res_dev" is distributed, from the plurality of frames included in the target section. The residual error is distributed to each of the extracted frames by one pixel. This eliminates the need for subpixel processing.

Next, the second correction unit 24 updates the residual error "res_dev" as res_dev=res_dev-span/ivl (S20). Specifically, the residual error is updated based on the difference between the residual error "res_dev" obtained in S17 and the correction amount "span/ivl" the correction made in the processing of S19.

The second correction unit 24 determines whether the absolute value |res_dev| of the residual error "res_dev" updated in S20 is smaller than a threshold "th" (S21). Since the correction is properly made when the absolute value |res_dev| of the residual error is smaller than the threshold "th" (YES in S21), the processing ends.

When the absolute value |res_dev| of the residual error is equal to or greater than the threshold "th" (NO in S21), the process returns to step S18 to repeat the processing. Specifically, the second correction unit 24 extracts the frames, to which the residual error is distributed by one pixel, from a plurality of frames included in the target section. Then the second correction unit 24 repeats similar processing until the absolute value |res_dev| of the latest residual error becomes smaller than the threshold "th". In other words, the second correction unit 24 compares the residual error with the threshold, to thereby determine whether or not to perform the correction process again. The second correction unit 24 repeatedly corrects the motion vectors until the absolute value of the updated residual error converges to the threshold or less.

Figure 5:
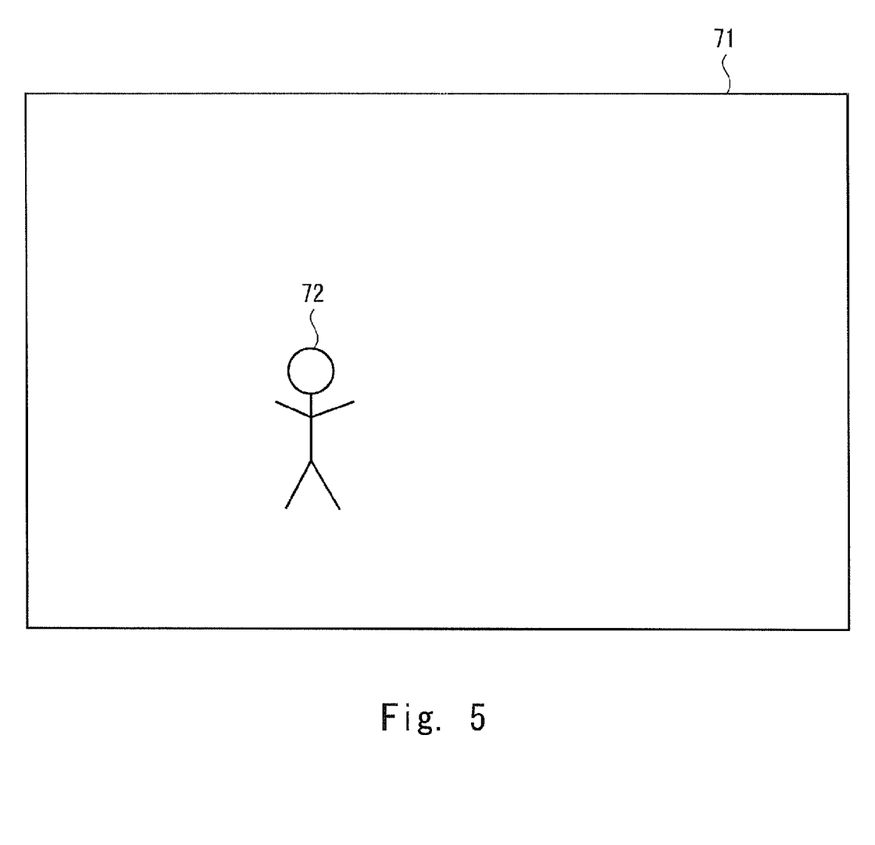
FIG. 5 is a diagram showing a joined image.

The above-described processing is respectively performed on each of the horizontal component and the vertical component. The texture writing unit 28 repeatedly overwrites the frame memory with the temporally subsequent frame by using a group of corrected motion vectors. Accordingly, as shown in FIG. 5, the joined image 71 in which the cumulative errors are corrected is generated. In the joined image 71 obtained after the correction process, the subject 72 is written at the same position in the frame memory 29 before and after the time when the subject 72 is out of the field of view. Therefore, the cumulative errors caused due to the looping path problem can be reduced. Consequently, a joined image in which misalignment is less likely to occur can be generated.

The correction process can be performed without using high-precision sensors such as a direction sensor, a posture sensor, and an acceleration sensor. This contributes to downsizing of the camera and a reduction in the cost thereof.

After the first correction unit 23 performs the correction process using the same correction value for the motion vectors of all frames, the second correction unit 24 extracts the motion vectors to be corrected. This eliminates the need for subpixel processing. Accordingly, the cumulative errors caused due to the looping path problem can be reduced by simple processing. Consequently, a joined image in which misalignment is less likely to occur can be generated in a short time.

Further, the second correction unit 24 compares the updated residual error with the threshold "th", thereby determining whether or not to perform the correction again depending on the comparison result. This allows the absolute value of the residual error to converge to the threshold or less. For example, when three pixels are used as the threshold "th", the cumulative errors can be reduced to less than three pixels. Thus, a joined image in which misalignment is less likely to occur can be generated.

The correction of motion vectors so as to absorb the cumulative errors is performed on the entire area of the target section, thereby making it possible to alleviate the "looping path problem" without causing a sense of incongruity in the entire area of the joined image. Note that implementations of the present invention in the form of a method, an apparatus, a system, a recording medium, a computer program, and the like may also be effective as aspects of the present invention.

The above-described processing will be described in more detail below using specific values. This exemplary embodiment is not limited to the specific values given below.

Assuming that the start frame number f_begin=480 [frame] and the end frame number f_end=560[frame], the frame number span=80[frame] holds in step S14. The cumulative error dev=−210[pixel] also holds.

As a result of the truncating integer arithmetic for the correction value vadj=dev/span in step S15, vadj=(int)(−210/80)=−2[pixel/frame] holds. Accordingly, in step S16, only −2 pixels are subtracted from all motion vectors in the target section. In other words, the first correction unit 23 adds two pixels to the motion vectors of all frames included in the target section.

In step S17, when the second correction unit 24 calculates the residual error res_dev=dev-vadj*span, the residual error res_dev=−210−(−2×80)=−50[pixel] holds. In step S18, when the second correction unit 24 calculates the frame interval ivl=span/res_dev using truncating integer arithmetic, the frame interval (int)ivl=(80/(−50))=−1 holds.

In step S19, only ivl/|ivl|=−1[pixel] is subtracted from the motion vectors every |ivl|=1 frame. In other words, since the residual error "res_dev" is a negative value, one pixel is added to each motion vector every one frame.

In step S20, when the residual error "res_dev" is updated as res_dev=res_dev-span/ivl, the residual error res_dev=−50−80/(−1)=30 holds. In step S21, the updated residual error "res_dev" is compared with the threshold "th". Since the threshold "th" equals 3, the process returns to step S18.

In the second round of step S18, the frame interval ivl=(int)(80/30)=2 is obtained as a result of a calculation assuming that frame interval ivl=span/res_dev. Accordingly, in the second round of step S19, only ivl/|ivl|=1[pixel] is subtracted from the motion vectors every |ivl|=2 frames. In this case, since the residual error "res_dev" is a positive value, one pixel is subtracted from each motion vector every two frames. In this case, the motion vectors are corrected only in even-numbered frames or odd-numbered frames.

In the second round of step S20, when the residual error "res_dev" is updated as res_dev=res_dev-span/ivl, the residual error res_dev=30−80/(2)=−10 holds. In step S21, the updated residual error res_dev=−10 is compared with the threshold "th". Since the threshold "th" equals 3, the process returns to step S18.

In the third round of step S18, when the frame interval "ivl" is calculated as ivl=span/res_dev, the frame interval ivl=(int)(80/(−10))=8 holds. Accordingly, in the third round of step S19, only ivl/|ivl|=−1[pixel] is subtracted from the motion vectors every |ivl|=8 frames. In this case, since the residual error "res_dev" is a negative value, one pixel is added to each motion vector every eight frames.

In the third round of step S20, when the residual error "res_dev" is updated as res_dev=res_dev-span/ivl, the residual error res_dev=−10+80/(8)=0 holds. In step S21, the updated residual error res_dev=0 is compared with the threshold "th". Since the threshold "th" equals 3, the processing ends. In other words, since the residual error is small enough, the processing ends.

The above-described method avoids the occurrence of misalignment during photographing along a reciprocating camera trajectory in the process of creating a still image by joining moving images captured while manually moving the camera along a free two-dimensional trajectory. If the camera 100 is mounted on a camera platform capable of performing a pan/tilt operation, the camera 100 can be electrically moved instead of being manually moved.

The present invention has been described above with reference to exemplary embodiments. The exemplary embodiments are illustrated by way of example only. As understood by those skilled in the art, various modifications can be made by arbitrarily combining the components and processing processes, and such modifications are included in the scope of the present invention.

The whole or part of the image processing described above may be implemented by a computer program. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

While the invention made by the present inventor has been described in detail above with reference to exemplary embodiments, the present invention is not limited to the above exemplary embodiments and can be modified in various manners without departing from the scope of the invention.

For example, an advantageous effect that a joined image in which misalignment is less likely to occur can be generated is provided by the following structure. That is, an image processing apparatus that generates a joined image by joining a plurality of textures based on a plurality of images, the image processing apparatus including: a derivation unit that derives a motion between images of the plurality of images; a texture writing unit that writes, into a frame memory, the plurality of textures that form the joined image, based on the motion between the images; and a detection unit that analyses a first image including a subject and a second image that includes at least a part of the subject and is captured after the first image, and detects a position of the subject in the first image and a position of the subject in the second image. The texture writing unit writes, into the frame memory, an image between the first image and the second image based on the position of the subject in the first image and the position of the subject in the second image.

The case where a frame including a subject is set as the start frame of the target section and a frame in which the subject that is temporarily out of the field of view is positioned in the field of view again is set as the end frame of the target section has been illustrated by way of example only. However, the frame in which the subject that is temporarily out of the field of view is positioned in the field of view again is not necessarily used as the end frame.

The subject 72 is displayed in a duplicate manner in the joined image in some cases not only when the subject 72 is temporarily moved outside of the field of view as in the "looping path problem", but also when the field of view is changed by moving the camera in a wide range. Also in such a case, the misalignment in the joined image can be reduced by using the above-described image processing method. Furthermore, the method for correcting the cumulative errors accumulated in the range from the first image to the second image is not limited to the above-described method.

Thus, the image processing apparatus according to this exemplary embodiment may have the following structure. That is, an image processing apparatus that generates a joined image by joining a plurality of textures based on a plurality of images, the image processing apparatus including: a motion vector derivation unit (for example, the motion vector derivation unit 21 shown in FIG. 1) that derives a motion vector between images of the plurality of images; a correction unit (for example, the correction unit 40 shown in FIG. 1) that corrects a motion vector between images included in a target section from a first image to a second image based on cumulative errors in the section from the first image to the second image; and a texture writing unit (for example, the texture writing unit 28 shown in FIG. 1) that writes, into a frame memory, the plurality of textures that form the joined image, based on the motion vector corrected by the correction unit. According to this structure, the motion vector between the plurality of images is corrected based on cumulative errors in the section from the first image to the second image, thereby making it possible to reduce the misalignment of the subject in the joined image. Further, the cumulative errors can be corrected without using any information from a direction sensor, a posture sensor, an acceleration sensor, or the like, which leads to downsizing, weight saving, and cost reduction.

The correction unit may correct a motion vector between a plurality of images including images in the section from the first image to the second image based on cumulative errors in the section from the first image to the second image. According to this structure, the motion vector between images in the section from the first image to the second image can be corrected.

The image processing apparatus may further include a cumulative error acquisition unit that acquires the cumulative errors by comparing the first image with the second image. With this structure, the cumulative errors can be correctly acquired, thereby making it possible to reduce the misalignment of the subject in the joined image.

The cumulative error acquisition unit may acquire the cumulative errors based on a position of a subject included in the first image and a position of the subject included in the second image, the subject being determined by a user. This structure enables the user to determine the extraction of the cumulative errors by, for example, a visual observation based on the misalignment of the subject.

In the above-described image processing apparatus, the second image may be an image in which a subject that is included in the first image and temporarily out of a field of view is positioned in the field of view again. This makes it possible to reduce the misalignment caused due to the "looping path problem". In this case, the subject is included in both the first image and the second image, and a third image, which does not include the subject, is located between the first image and the second image.

The correction unit may correct a motion vector by evenly distributing the cumulative errors to a plurality of frames by n (n is an integer including 0) pixels, the plurality of frames being included in the target section. With this structure, the correction values for motion vectors of all frames in the target section can be made equal.

The correction unit may evenly distribute the cumulative errors to a plurality of frames by n (n is an integer including 0) pixels, the plurality of frames being included in the target section. Further, the correction unit may extract, from the target section, distributed frames to which residual errors obtained after removing an evenly-distributed correction amount from the cumulative errors are distributed. Furthermore, the correction unit may correct the motion vector by distributing the residual errors to each of the distributed frames by one pixel. This structure eliminates the need for subpixel processing.

The image processing method according to this exemplary embodiment may have the following structure. That is, an image processing method that generates a joined image by joining a plurality of textures based on a plurality of images, the image processing method including: a motion vector derivation step of deriving a motion vector between images of the plurality of images; a correction step of correcting a motion vector between images included in a target section from a first image to a second image based on cumulative errors in the section from the first image to the second image; and a texture writing step of writing, into a frame memory, the plurality of textures that form the joined image, based on the motion vector corrected in the correction step. The motion vector between the plurality of images is corrected based on the cumulative errors in the section from the first image to the second image, thereby making it possible to reduce the misalignment of the subject in the joined image.

An image processing program according to this exemplary embodiment may have the following structure. That is, a program for causing a computer to execute image processing that generates a joined image by joining a plurality of textures based on a plurality of images, the image processing including: a motion vector derivation step of deriving a motion vector between images of the plurality of images; a correction step of correcting a motion vector between images included in a target section from a first image to a second image based on cumulative errors in the section from the first image to the second image; and a texture writing step of writing, into a frame memory, the plurality of textures that form the joined image, based on the motion vector corrected in the correction step. The motion vector between the plurality of images is corrected based on the cumulative errors in the section from the first image to the second image, thereby making it possible to reduce the misalignment of the subject in the joined image.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

According to the present invention, it is possible to provide an image processing apparatus, an image processing method, a program, and a camera which are capable of generating a joined image in which misalignment is less likely to occur.

The above and other objects, features and advantages of the present invention will become more fully understood from the detailed description given hereinbelow and the accompanying drawings which are given by way of illustration only, and thus are not to be considered as limiting the present invention.

What is claimed is:

1. An image processing apparatus that generates a joined image by joining a plurality of textures based on a plurality of images, the image processing apparatus comprising:

a motion vector derivation unit that sequentially derives motion vectors between images of the plurality of images;

a correction unit that calculates cumulative errors corresponding to misalignment between a position of a subject in a first image and a position of the subject in a second image, and corrects the motion vectors between images included in a target section from the first image to the second image based on the cumulative errors and a number of frames included in the target section, wherein the first image includes the subject and wherein the second image includes the subject and is captured after the subject is out of a field of view; and a texture writing unit that writes, into a frame memory, the plurality of textures that form the joined image, based on the motion vectors corrected by the correction unit.

2. The image processing apparatus according to claim 1, wherein the correction unit corrects the motion vectors based on a correction value, and wherein the correction value is derived by dividing the cumulative errors by the number of frames in the target section.

3. The image processing apparatus according to claim 2, wherein the correction unit calculates residual errors based on the cumulative errors, the number of the frames in the target section and the correction value; and the correction unit extracts distributed frames from the target section, and the correction unit corrects the motion vectors by distributing the residual errors to each of the distributed frames.

4. A camera comprising:
an image pickup unit that captures a plurality of images; and
the image processing apparatus according to claim 1.

5. An image processing method that generates a joined image by joining a plurality of textures based on a plurality of images, the image processing method comprising:
- a motion vector derivation step of sequentially deriving motion vectors between images of the plurality of images;
- a cumulative error calculating step of calculating cumulative errors corresponding to misalignment between a position of a subject between a first image and a position of the subject in a second image, wherein the first image includes the subject, and wherein the second image includes the subject and is captured after the subject is out of field of view;
- a correction step of correcting the motion vectors between images included in a target section from a first image to a second image based on the cumulative errors and a number of frames in the target section; and
- a texture writing step of writing, into a frame memory, the plurality of textures that form the joined image, based on the motion vectors corrected in the correction step.

6. A non-transitory computer readable medium storing a program for causing a computer to execute image processing that generates a joined image by joining a plurality of textures based on a plurality of images, the image processing comprising:
- a motion vector derivation step of sequentially deriving motion vectors between images of the plurality of images;
- a cumulative error calculating step of calculating cumulative errors corresponding to a misalignment between a position of a subject between a first image and a position of the subject in the second image, wherein the first image includes the subject, and wherein the second image includes the subject and is captured after the subject is out of a field of view;
- a correction step of correcting the motion vectors between images included in a target section from the first image to the second image based on the cumulative errors and a number of frames in the target section; and
- a texture writing step of writing, into a frame memory, the plurality of textures that form the joined image, based on the motion vector corrected in the correction step.

* * * * *